United States Patent

Höller et al.

[11] Patent Number: 5,896,675
[45] Date of Patent: Apr. 27, 1999

[54] DEVICE WITH AT LEAST ONE STORAGE CONTAINER FOR MATERIAL TO BE TREATED, PREFERABLY PLASTIC MATERIAL GRANULES

[75] Inventors: Klaus Höller, Constance; Manfred Nowak, Immenstaad, both of Germany

[73] Assignee: Motan Holding GmbH, Konstanz, Germany

[21] Appl. No.: 08/702,311

[22] Filed: Aug. 23, 1996

[30] Foreign Application Priority Data

Aug. 26, 1995 [DE] Germany .................. 195 31 446

[51] Int. Cl.[6] ........................................ F26B 19/00
[52] U.S. Cl. ........................... 34/548; 34/473; 34/80
[58] Field of Search ........................ 34/80, 473, 474, 34/548, 524, 557

[56] References Cited

U.S. PATENT DOCUMENTS

| | | | |
|---|---|---|---|
| 3,621,585 | 11/1971 | Robertson | 34/80 X |
| 3,972,129 | 8/1976 | Graff | 34/80 X |
| 4,413,426 | 11/1983 | Graff | 34/80 X |
| 4,530,167 | 7/1985 | Hotovy | 34/548 X |
| 4,601,114 | 7/1986 | Noguchi | 34/80 X |
| 4,653,199 | 3/1987 | McLeod et al. | 34/80 |
| 4,858,335 | 8/1989 | Roth | 34/80 X |
| 4,918,837 | 4/1990 | Graff | 34/80 |
| 4,974,337 | 12/1990 | Tavakoli et al. | 34/80 X |
| 5,172,489 | 12/1992 | Moller | 34/80 X |
| 5,457,897 | 10/1995 | Becker | 34/80 X |
| 5,487,225 | 1/1996 | Downie | 34/473 |
| 5,546,673 | 8/1996 | Weagraff et al. | 34/80 |
| 5,566,468 | 10/1996 | Graeff | 34/473 X |

Primary Examiner—Christopher B. Kilner
Attorney, Agent, or Firm—Robert W. Becker & Associates

[57] ABSTRACT

A device has at least one storage container for material to be treated with at least one inlet line and at least one return line for circulating process air therethrough. At least one heating device for heating the process air is provided as well as at least one blower for circulating the process air. A control device for receiving a nominal dew point value is provided. At least one dew point measuring device is connected to the control device for measuring the actual dew point of the process air and transmitting the actual dew point value to the control device. A first mixing valve is connected either to the inlet line or to the return line. The control device controls the first mixing valve by comparing the actual dew point value to the nominal dew point value and sending a respective control signal to the first mixing valve such that the process air has a dew point corresponding to a specific nominal, residual moisture-dependent air dew point of the material to be treated.

15 Claims, 3 Drawing Sheets

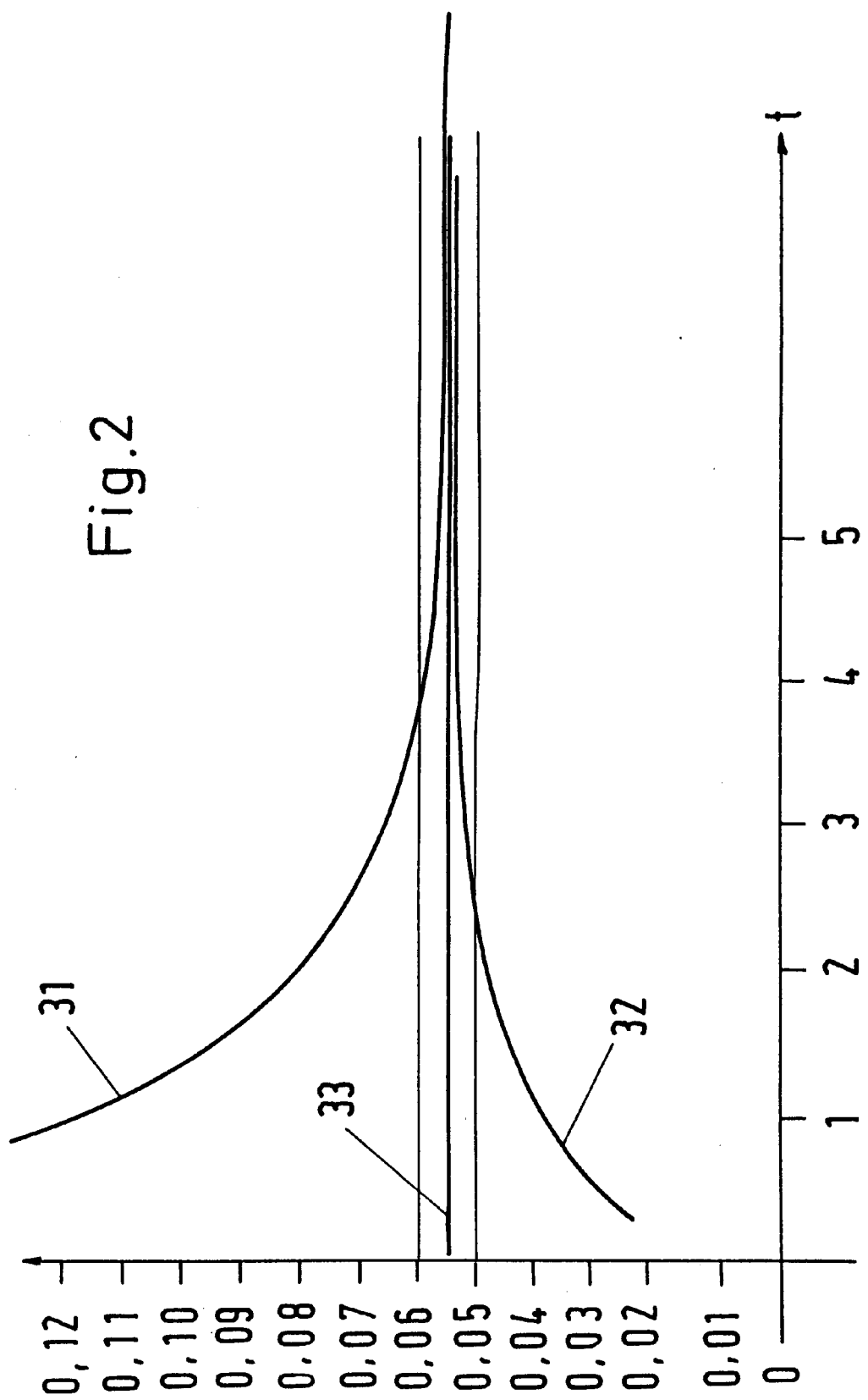

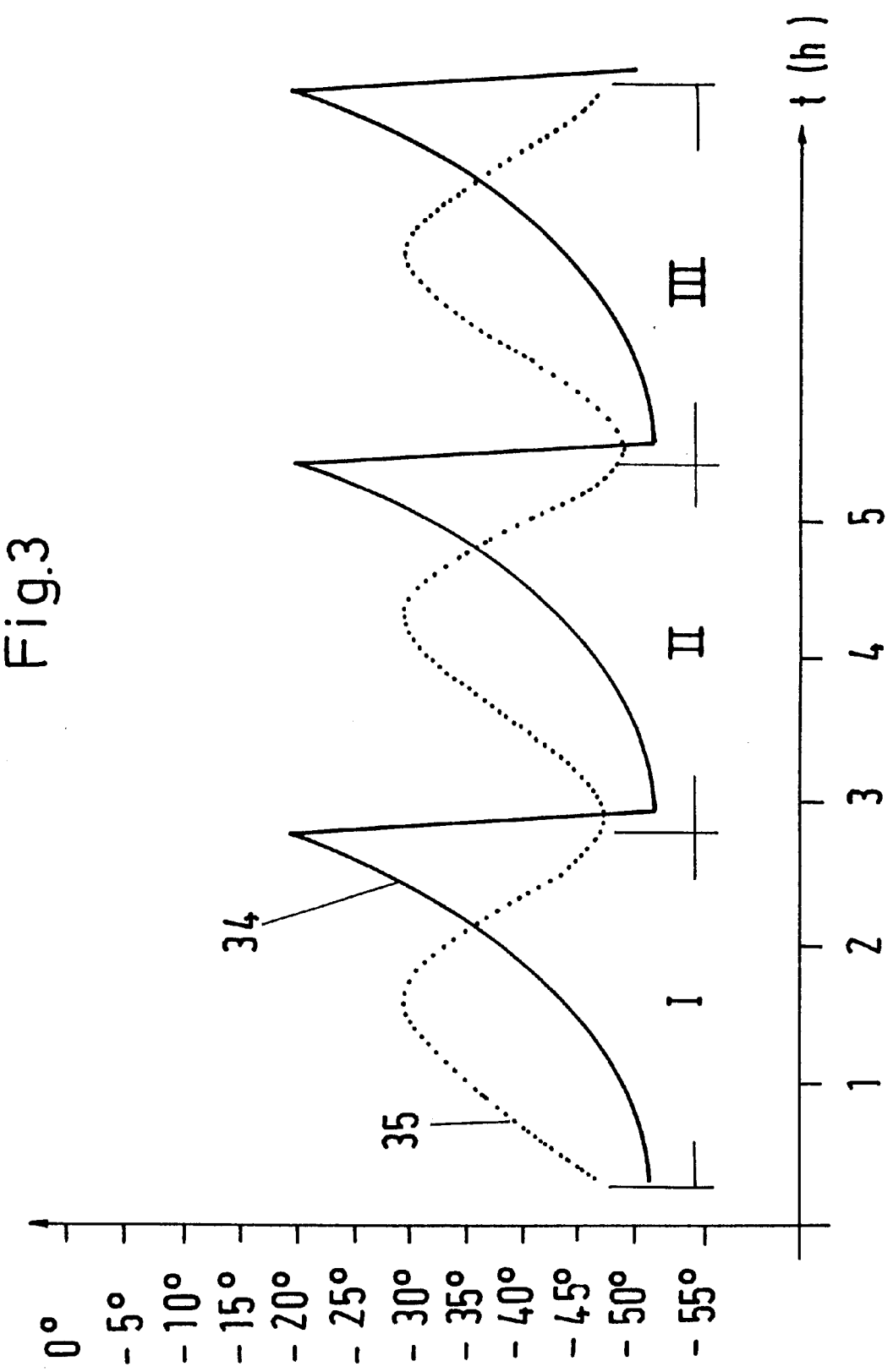

DEVICE WITH AT LEAST ONE STORAGE CONTAINER FOR MATERIAL TO BE TREATED, PREFERABLY PLASTIC MATERIAL GRANULES

BACKGROUND OF THE INVENTION

The present invention relates to a device with at least one storage container for material to be treated, preferably for plastic material granules, with at least one inlet line and at least one return line for process air and with at least one heating device for the process air and at least one blower for conveying the process air.

In certain applications in the drying technology, it is necessary to dry material resulting from a manufacturing process to a certain defined residual moisture contents. For a plastic material in granular form, it is, for example, possible to achieve a minimum residual moisture contents of 0.01%. Depending on the production conditions of the plastic material, the residual moisture contents may vary upon delivery, for example, between 0.02% and 1.8%. For further processing of the plastic material granules, it is however necessary to reduce the moisture contents to, for example, a value of exactly 0.05% to at most 0.06% in order to achieve certain material properties of the finished part produced from the plastic material granules.

In conventional devices process air is generated with a dew point of approximately −20° C. to −50° C. The process air is guided through the material to be treated and takes up moisture while passing through the material. The return air flowing out of the storage container is introduced into a drying agent cartridge which takes up the moisture contained in the process air so that dry process air can be returned into the storage container. The dew point is subject to fluctuations because the drying agent cartridge will be saturated over the course of its period of use which is, in general, approximately 2 to 5 hours. Thus, the drying capacity will be reduced over time. FIG. 3 shows this relationship in a diagram in which the dew point is represented as a function of the drying time T. At the beginning of the drying process the dew point is very low; in the represented embodiment it is below −50° C. With increasing treatment time, respectively, drying time the drying cartridge is loaded increasingly with moisture so that it can take up less and less moisture from the process air. This results in an increase of the dew point until the drying agent cartridge is saturated and must be replaced. The drying agent cycle of the drying agent cartridge is represented in FIG. 3 and identified with I. When a new drying agent cartridge is introduced, a new drying cycle II begins. Since the new drying agent cartridge has not taken up any moisture yet, the dew point is suddenly reduced and is again very low. With increasing process time, the dew point climbs again to the system-specific maximum dew point which is, in general, approximately −20° C. Upon reaching this maximum value, the drying agent cartridge is again replaced with a fresh, regenerated drying agent cartridge. A new drying cycle III begins. In this manner a dew point curve 34, as a function of the degree of saturation of the drying agent cartridge, results for each drying process.

Attempts have been made to smoothen this curve. This is represented by the curve 35 in FIG. 3. In this case, drying agent dampers are introduced into the system which are in the form of molecular sieve cartridges. Thus, the dew point curve 35 is smoother than the dew point curve 34. It is also possible to reduce the degree of fluctuation of the dew point over the course of the process with a multi-cartridge technique.

It is furthermore known to realize a continuously low dew point with drying agent wheels. However, the dew point will fluctuate with the moisture load of the system. Thus, in the past the material to be treated was subjected to drying air with a dew point as low as possible for a certain amount of time in order to achieve a minimal residual moisture contents as low as possible. However, since the initial moisture contents of the material fluctuates, this drying technique cannot provide any improvement. Thus, the drying parameters are to be adjusted for the worst case scenario. However, for good drying conditions, this will result in an overdrying of the material leading to unfavorable processing parameters and material properties.

It is therefore an object of the present invention to improve a device of the aforementioned kind such that, for controlling in a directed manner a defined residual moisture contents of the material to be dried, a preselected dew point temperature can be maintained constant at least within certain limits.

SUMMARY OF THE INVENTION

The inventive device is primarily characterized by:

At least one storage container for material to be treated with at least one inlet line and at least one return line for circulating process air therethrough;

At least one heating device for heating the process air;

At least one blower for circulating the process air;

A control device for receiving a nominal dew point value;

At least one dew point measuring device connected to the control device for measuring the actual dew point of the process air and transmitting the actual dew point value to the control device;

A first mixing valve connecting to one of the at least one inlet line and the at least one return line; and The control device controlling the first mixing valve by comparing the actual dew point value to the nominal dew point value and sending a respective control signal to the first mixing valve such that the process air has a dew point corresponding to a specific nominal air dew point of the material to be treated, which specific nominal air dew point depends on the residual moisture contents of the material to be treated.

The first mixing valve is positioned in the return line.

Advantageously, the device further comprises an intermediate line having a mouth connected to the inlet line, wherein the first mixing valve is connected to the intermediate line.

Advantageously, the device further comprises at least one drying agent unit (cartridge), the at least one return line connected to the drying agent unit.

Preferably, the mouth is a mixing location where air dried in the drying agent unit and moist air are mixed to form the process air.

Advantageously, for drying the material to be treated, the first mixing valve is controlled by the control device such that the return air leaving the at least one container is guided to the drying agent unit and into the intermediate line in a ratio such that the process air has an actual air dew point that is at least approximately equal to the nominal air dew point value.

Expediently, the device further comprises at least one second mixing valve positioned within the return line and connected to the control device.

The second mixing valve is preferably positioned at the suction side of the blower.

The second mixing valve is connected to the ambient air and is adjustable such that, for humidifying the material to be treated, humid ambient air is mixed into the process air.

Advantageously, the device further comprises at least one humidifying device.

The at least one humidifying device is positioned in the inlet line.

Preferably, the at least one humidifying device is positioned upstream of the dew point measuring device in a flow direction of the process air.

Advantageously, each one of the storage containers has coordinated therewith one of the first mixing valves, one of the intermediate lines, one of the humidifying devices, one of the dew point measuring devices, and one of the blowers.

In another embodiment of the present invention, the device has a plurality of storage containers combined to a storage unit and the storage unit has coordinated therewith one first mixing valve, one intermediate line, one humidifying device, one dew point measuring device and one blower.

With the inventive dew point measuring device of the inventive device, the actual air dew point of the process air is measured and sent as a corresponding actual value (signal) to the control device. The control device compares this actual value with a predetermined nominal value of the dew point. When the two values are not equal, a corresponding control signal is sent to the mixing valve which is then adjusted such that the process air assumes an air dew point that corresponds to the specific, residual moisture-dependent nominal value of the air dew point of the material to be treated. Accordingly, the dew point can be kept at a predetermined value independent of the duration of the process. Thus, the material to be treated is adjusted to a defined residual moisture independent of the initial moisture contents of the material.

When the material is to be dried, it is advantageous to introduce via the mixing valve the process air in a certain ratio of moist to dried air into at least one drying agent unit. By doing so, the material to be dried can be adjusted to the specific residual moisture-dependent nominal value of the air dew point while maintaining at a constant level the preselected dew point temperature.

When the material to be dried has a moisture contents that is too low, it is possible to introduce via a second mixing valve moist ambient air to the process air comprised of dried and moist air mixed in a certain ratio. It is thus also possible for a dry material, while maintaining constant the preselected dew point temperature, to achieve a defined residual moisture contents of the material.

It is advantageous to introduce the required amount of moisture into the process air for remoistening the material with at least one humidifying device.

BRIEF DESCRIPTION OF THE DRAWINGS

The object and advantages of the present invention will appear more clearly from the following specification in conjunction with the accompanying drawings, in which:

FIG. 2 shows in a diagram exemplary adjustment curves for reaching a defined residual moisture contents of plastic material granules; and FIG. 3 shows in a diagram the fluctuations of drying air dew points in conventional drying devices.

DESCRIPTION OF THE PREFERRED EMBODIMENTS

Figure 1:
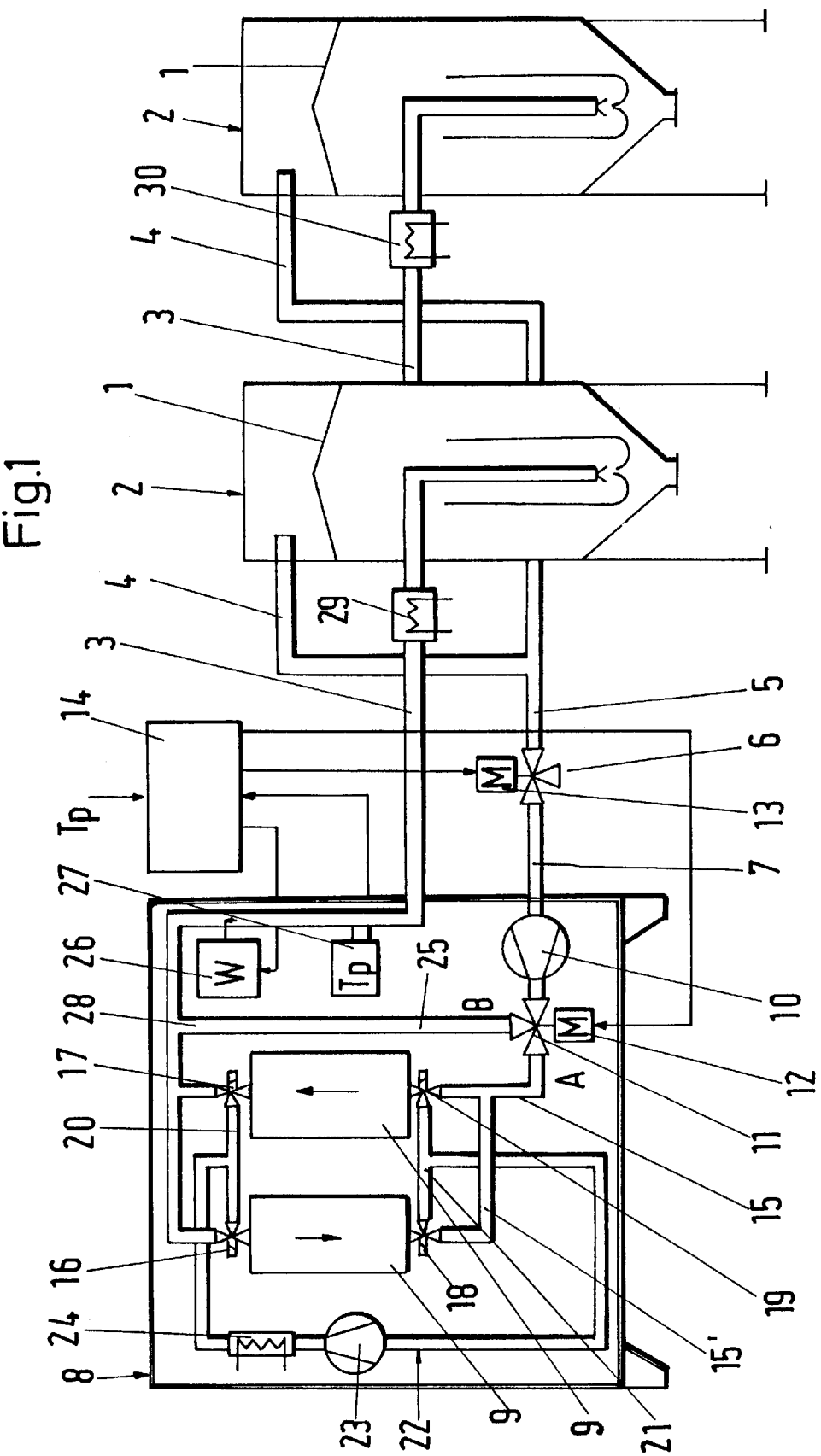
FIG. 1 is a schematic representation of the inventive device for keeping constant preselected dew point temperatures.

The present invention will now be described in detail with the aid of several specific embodiments utilizing FIGS. 1 through 3.

The inventive device is designed to maintain a preselected dew point temperature at least approximately at a constant level in order to be able to adjust in a directed manner a defined residual moisture contents of the material to be dried. The material 1 to be dried, preferably plastic material granules, is stored in two drying hoppers 2. The device can also be comprised of only a single or more than two drying hoppers. A drying air inlet line 3 extends downwardly into the drying hopper to the bottom of the drying hopper 2. The drying air inlet line 3 ends in a manner known per se close to the bottom of the drying hopper so that the drying air exiting from the inlet line must flow upwardly through the material 1 to be dried. In the upper area of each drying hopper 2 a return line 4 is provided which guides the process air loaded with moisture away from the respective drying hopper 2. The two return lines 4 are joined in a common return line 5. It is connected to an ambient air mixing valve 6 which is connected to an inlet line 7. The inlet line 7 extends to a dry air generator 8 in which are arranged two drying agent cartridges 9, preferably containing molecular sieves. Depending on the design of the device, the dry air generator 8 can also be provided with only one drying agent cartridge or more than two drying agent cartridges.

In the inlet line 7 a blower 10 is positioned which is preferably arranged within the dry air generator 8. The blower 10, of course, can also be provided external to the dry air generator 8. At the pressure side of the blower 10 a mixing valve 11 is provided within the dry air generator 8 which can be adjusted by a control member 12. The ambient air mixing valve 6 is also provided with a control member 13. Both control members 12, 13 are connected to a control device 14 with which, in a manner which will be disclosed in the following, the mixing valves 6, 11 can be adjusted as desired.

Connected to the mixing valve 11 is a connecting line 15 which connects the mixing valve 11 with the drying agent cartridge 9. From the connecting line 15 a further connecting line 15' branches off which extends to the other drying agent cartridge (unit) 9. Upstream and downstream of each drying agent cartridge 9 switching valves 16 through 19 are provided. The switching valve 16 and 17, positioned at the same side of the drying agent cartridges 9, as well as 18 and 19 are connected with one another via lines 20, respectively, 21. They are part of a heating circuit 22 which is provided within the dry air generator 8 and with which the air is optionally heated. For this purpose, within the circuit 22 a blower 23 is provided which has arranged at its pressure side a heating device 24.

The two switching valves 16 and 17 are connected to the drying air inlet line 3. Within the dry air generator 8 this drying air inlet line 3 is connected via an intermediate line 25 to the mixing valve 11.

A humidifying device 26 as well as a dew point measuring device 27 arranged downstream thereof in the flow direction of the process air are arranged within the drying air inlet line 3 within the dry air generator 8. The humidifying device 26 and the dew point measuring device 27 are also connected to the control device 14.

The process air loaded with moisture and guided away from the drying hoppers 2 via the return lines 4 is guided via the common return line 5 to the mixing valve 11. The mixing valve 11 is adjusted with the control device 14 such that a portion of the return air loaded with moisture is guided via the connecting line 15 into the drying agent cartridge 9 at the right hand side of FIG. 1 while another portion of the return air is guided via the intermediate line 25, without being dried, to a mixing location 28 which is formed by the mouth of the intermediate line 25 connected to the drying air inlet line 3. The portion of the return air flowing within the connecting line 15 is dried upon passing through the drying agent cartridge 9 in a manner known per se and reaches via the switching valve 17 the drying air inlet line 3. The portion of the return air, indicated with reference numeral A, which flows through the drying agent cartridge 9 in FIG. 1 and the portion of the return air, indicated with reference numeral B, which is returned without being dried via the intermediate line 25 are shown in FIG. 1. At the mixing location (mouth) 28 the return air portion A dried by passing through the drying agent cartridge 9 is mixed with the moist return air portion B. The thus resulting process air (drying air) flows via the drying air inlet line 3 into the drying hoppers 2. In the flow direction upstream of the drying hoppers 2 a heating device 29, 30 is located within the drying air inlet lines 3 with which the drying air can optionally be heated before entering the drying hoppers 2.

The drying air (process air) formed in a mixing ratio A/B flows along the dew point measuring device 27 which measures the air dew point of the drying air in the flow direction downstream of the mixing location 28. The measuring device 27 sends a corresponding signal of the measured value to the control device 14 which compares the actual (measured) air dew point with the nominal air dew point stored within the control device. Depending on the measured values and comparison results, the control member 12 of the mixing valve 11 is accordingly adjusted. The drying air flows, after exiting the drying air inlet lines 3, through the material to be dried and adjusted to a certain residual moisture contents from the bottom to the top and is returned via the return lines 4 again into the dry air generator 8.

When the drying air downstream of the mixing location 28 in the flow direction falls below the predetermined nominal value of the dew point temperature, the control device 14 sends a corresponding control signal to the control member 12 which adjusts the mixing valve 11 such that the return flow portion B, which flows without being dried to the intermediate line 25, is increased. Correspondingly, the return flow portion A which flows through the drying agent cartridge 9 is reduced. According to these aforedescribed changes of the mixing ratio of dried and moist return air, the dew point temperature is increased. The dew point measuring device 27 constantly measures the dew point temperature so that via the control 14 the desired dew point temperature can be automatically controlled.

When the dew point temperature of the drying air surpasses the predetermined nominal value of the dew point temperature at the mixing location 28, the control member 12 of the mixing valve 11 is adjusted such that the introduction of the moist return air into the intermediate line 25 is reduced and the flow of air to be dried into the connecting line 15 is increased. At the mixing location 28 the mixing ratio is thus increased with respect to the dry air contents so that the dew point temperature is lowered.

As long as the drying air introduced into the drying hoppers 2 has the required nominal dew point temperature, the mixing valve 11 remains in the thus adjusted position. The aforedescribed control circuit thus continuously and automatically monitors and controls the actual dew point temperature according to the nominal dew point temperature saved within the control device 14.

With the aid of the humidifying device 26 it is possible to generate a substantially constant high dew point temperature. The humidifying device 26 is preferably arranged between the mixing valve 11 and the dew point measuring device 27. It can, of course, be provided at any other suitable location, for example, within the return lines 4, 5. The mixing valve 11 can be arranged at any suitable location, for example, within the intermediate line 25. The humidifying device 26 can be embodied as an active element (based on evaporating technology) or in any other suitable manner. The humidifying device 26 can also be designed such that it simply introduces moist ambient air. The humidifying device 26 is activated when the air flow through the drying agent cartridge 9 is completely throttled and the dew point of the process air is not yet high enough. In this case, the humidifying device 26 receives a corresponding signal from the control device 14. The control device 14 then sends a corresponding control signal to the control member 13 which adjusts the ambient air mixing valve 6 such that ambient air laden with moisture is sucked into the device. For this purpose, the ambient air mixing valve 6 is advantageously arranged at the suction side of the blower 10. The introduction of moisture is controlled as a function of the nominal value of the dew point temperature within the control 14. In this manner, it is fairly simple to adjust a certain moisture contents within the drying air.

It is also possible to activate only the humidifying device 26 or only the ambient mixing valve 6. For example, the required moisture for the drying air can be introduced exclusively via the humidifying device 26. When only the ambient air mixing valve 6 is activated, the ambient air is sucked in with the blower 10 to be introduced into the drying air.

The drying air adjusted to a certain dew point is introduced via the drying air inlet line 3 into the drying hoppers 2. The drying temperature is adjusted with the corresponding heating devices 29, 30.

The blower 10, which is preferably arranged within the dry air generator 8, is operated in closed or open circuit with a defined volume flow. In this manner constant ratios (with respect) to temperature, dew point, and air volume flow are provided within the drying hopper 2 so that the material 1 to be dried will reach a defined residual moisture contents.

Via the heating circuit 22 which is a regenerating circuit, the drying agent cartridges 9 can be dried in a known manner upon reaching a certain saturation ratio. In this context it is possible to regenerate one of the two drying agent cartridges 9 via the regenerating circuit 22 while the other drying agent cartridge 9 removes moisture from the process air introduced into the drying hoppers 2. The respective circuits can then be switched such that the other drying agent cartridge 9 now removes moisture from the return air while the now saturated drying agent cartridge is switched to the regenerating circuit 22 to be regenerated.

Via the disclosed mixing ratio A/B of dried and moist return air, the desired dew point temperature can be easily adjusted. The material 1 is thus not provided, as in the past, with a minimal but an optimal residual moisture contents for further processing. Thus, a reduced amount of moisture or water is introduced into the circuit. The water uptake within the drying agent cartridges 9 is thus reduced and is even zero for remoisturizing of material to be dried. Furthermore, possibly present leakage within the system does not affect the system to a great extent because the water vapor pressure difference between the closed system and the ambient air is smaller so that the induced amount of water is lowered. Due to the reduced water uptake of the drying agent cartridges 9 the frequency of regeneration is reduced so that the energy consumption of this device component is considerably reduced.

The inventive device provides for an optimal quality assurance. Due to the constant parameters within the drying process the material quality for future processing can be ensured. The requirements according to DIN ISO 9000 for logging the manufacturing parameters can be fulfilled with this device because the dew point values are accessible via the control device 14.

In the embodiment according to FIG. 1 the two drying hoppers 2 from a storage unit and have coordinated therewith an equipment unit comprised of mixing valve 11, intermediate line 25, humidifying device 26, dew point measuring device 27, and blower 10. However, it is also possible to connect more than two drying hoppers 2 to such an equipment unit. On the other hand, it is possible to provide each one of the drying hoppers 2 with one such equipment unit. It is also possible to provide the equipment unit external to the drying air generator 8.

FIG. 2 shows with the aid of two curves the two possibilities for treating the material to be dried or to be moistened depending on the preset nominal value with respect to the residual moisture contents. The upper curve 31 shows the situation for a material 1 to be dried which has a high initial moisture contents at the beginning of the drying process. The lower curve 32 corresponds to a material 1 that at the beginning of the drying process has a minimal residual moisture. Both types of material 1 are to be adjusted to a preselected nominal value 33 with respect to their residual moisture contents. In the diagram according to FIG. 2 the residual moisture contents is represented in percent as a function of time. Both curves 31, 32 show that the water contents, respectively, the residual moisture in the material 1 asymptotically adapts, as a function of the residence time T within the drying hopper 2, to the water contents of the air. The material 1 to be dried will adapt continuously to the ambient conditions which are defined by the temperature and the water contents, respectively, by the dew point temperature. The vapor pressure within the air and the material 1 to be dried attempts to achieve equilibrium. These ambient conditions can only be maintained when the air is constantly recirculated by the blower 10 and the parameters within the entire drying space are thus maintained substantially constant. When it is desired that the material have a certain residual moisture, a constant ambient conditions (constant temperature with corresponding constant air dew point) must be provided which in equilibrium result in the desired residual moisture contents within the material 1. With the disclosed device the residual moisture contents can be simply and exactly adjusted.

The present invention is, of course, in no way restricted to the specific disclosure of the specification and drawings, but also encompasses any modifications within the scope of the appended claims.

What we claim is:

1. A device comprising:
    at least one storage container for material to be treated with at least one inlet line and at least one return line for circulating process air therethrough;
    at least one heating device for heating the process air;
    at least one blower for circulating the process air;
    a control device for receiving a nominal dew point value;
    at least one dew point measuring device connected to said control device for measuring the actual dew point of the process air and transmitting the actual dew point value to said control device;
    a first mixing valve connected to one of said at least one inlet line and said at least one return line; and
    said control device controlling said first mixing valve by comparing said actual dew point value to said nominal dew point value and sending a respective control signal to said first mixing valve for dividing return air leaving said at least one storage container into a first return air portion and a second return air portion, wherein the first return air portion is dried and the second return air portion is subsequently mixed into the dried first return air portion such that the process air has a dew point corresponding to a specific nominal air dew point of the material to be treated, which specific nominal air dew point depends on the residual moisture contents of the material to be treated, wherein the process air is guided in a closed circuit.

2. A device according to claim 1, wherein said first mixing valve is positioned in said return line.

3. A device comprising:
    at least one storage container for material to be treated with at least one inlet line and at least one return line for circulating process air therethrough;
    at least one heating device for heating the process air;
    at least one blower for circulating the process air;
    a control device for receiving a nominal dew point value;
    at least one dew point measuring device connected to said control device for measuring the actual dew point of the process air and transmitting the actual dew point value to said control device;
    a first mixing valve connected to one of said at least one inlet line and said at least one return line;
    said control device controlling said first mixing valve by comparing said actual dew point value to said nominal dew point value and sending a respective control signal to said first mixing valve such that the process air has a dew point corresponding to a specific nominal air dew point of the material to be treated, which specific nominal air dew point depends on the residual moisture contents of the material to be treated;
    an intermediate line having a mouth connected to said inlet line, wherein said first mixing valve is positioned in said return line and is connected to said intermediate line.

4. A device according to claim 3, further comprising at least one drying agent unit, said at least one return line connected to said drying agent unit.

5. A device according to claim 4, wherein said mouth is a mixing location where air dried in said drying agent unit and moist air are mixed to form the process air.

6. A device according to claim 5, wherein, for drying the material to be treated, said first mixing valve is controlled by said control device such that the return air leaving said at least one container is guided to said drying agent unit and into said intermediate line in a ratio such that the process air has an actual dew point that is at least approximately equal to the nominal dew point value.

7. A device according to claim 3, further comprising at least one humidifying device.

8. A device according to claim 7, wherein said at least one humidifying device is positioned in said inlet line.

9. A device according to claim 7, wherein said at least one humidifying device is positioned upstream of said dew point measuring device in a flow direction of the process air.

10. A device according to claim 7, wherein each one of said storage containers has coordinated therewith one of said first mixing valves, one of said intermediate lines, one of said humidifying devices, one of said dew point measuring devices, and one of said blowers.

11. A device according to claim 7, wherein a plurality of said storage containers are combined to a storage unit and wherein said storage unit has coordinated therewith one said first mixing valve, one said intermediate line, one said humidifying device, one said dew point measuring device, and one said blower.

12. A device comprising:
- at least one storage container for material to be treated with at least one inlet line and at least one return line for circulating process air therethrough;
- at least one heating device for heating the process air;
- at least one blower for circulating the process air;
- a control device for receiving a nominal dew point value;
- at least one dew point measuring device connected to said control device for measuring the actual dew point of the process air and transmitting the actual dew point value to said control device;
- a first mixing valve connected to one of said at least one inlet line and said at least one return line;
- said control device controlling said first mixing valve by comparing said actual dew point value to said nominal dew point value and sending a respective control signal to said first mixing valve such that the process air has a dew point corresponding to a specific nominal air dew point of the material to be treated, which specific nominal air dew point depends on the residual moisture contents of the material to be treated;
- said first mixing valve positioned in said return line;
- at least one second mixing valve positioned within said return line and connected to said control device.

13. A device according to claim 12, wherein said second mixing valve is positioned at the suction side of said blower.

14. A device according to claim 12, wherein said second mixing valve is connected to the ambient air and is adjustable such that, for humidifying the material to be treated, humid ambient air is mixed into the process air.

15. A device comprising:
- at least one storage container for material to be treated with at least one inlet line and at least one return line for circulating process air therethrough, wherein the process air includes dried return air coming from said at least one storage container and moist return air coming from said at least one storage container;
- at least one heating device for heating the process air;
- at least one blower for circulating the process air;
- a control device for receiving a nominal dew point value;
- at least one dew point measuring device connected to said control device for measuring the actual dew point of the process air and transmitting the actual dew point value to said control device;
- a first mixing valve connected to one of said at least one inlet line and said at least one return line;
- said control device controlling said first mixing valve by comparing said actual dew point value to said nominal dew point value and sending a respective control signal to said first mixing valve located in the path of the process air such that the dry return air and the moist return air are mixed and the mixture of dry return air and moist return air is guided into said at least one inlet line so that the process air has a dew point corresponding to a specific nominal air dew point of the material to be treated, which specific nominal air dew point depends on the residual moisture contents of the material to be treated.

* * * * *